(12) United States Patent
Liu et al.

(10) Patent No.: US 12,289,813 B2
(45) Date of Patent: Apr. 29, 2025

(54) SELF-ADAPTIVE CONSTANT-CURRENT DRIVING CIRCUIT AND METHOD FOR THREE-CHANNEL MULTI-COLOR LED

(71) Applicant: CRM ICBG (WUXI) CO., LTD., Jiangsu (CN)

(72) Inventors: Zhenli Liu, Jiangsu (CN); Sheng Zhou, Jiangsu (CN); Dongmin Ding, Jiangsu (CN); Pengfei Cai, Jiangsu (CN)

(73) Assignee: CRM ICBG(WUXI)CO., LTD., Jiangsu (CN)

( * ) Notice: Subject to any disclaimer, the term of this patent is extended or adjusted under 35 U.S.C. 154(b) by 0 days.

(21) Appl. No.: 18/266,403

(22) PCT Filed: Dec. 15, 2021

(86) PCT No.: PCT/CN2021/138234
§ 371 (c)(1),
(2) Date: Jun. 9, 2023

(87) PCT Pub. No.: WO2022/233139
PCT Pub. Date: Nov. 10, 2022

(65) Prior Publication Data
US 2024/0121870 A1  Apr. 11, 2024

(30) Foreign Application Priority Data

May 7, 2021 (CN) .......................... 202110495126.0

(51) Int. Cl.
*H05B 45/345* (2020.01)
*H05B 45/10* (2020.01)

(52) U.S. Cl.
CPC ........... *H05B 45/345* (2020.01); *H05B 45/10* (2020.01)

(58) Field of Classification Search
CPC ...... H05B 45/345; H05B 45/10; H05B 45/20; H05B 45/30; Y02B 20/40
See application file for complete search history.

(56) References Cited

U.S. PATENT DOCUMENTS

| 8,749,143 | B1* | 6/2014 | Saddig | ................... H05B 45/20 315/291 |
| 2011/0316441 | A1* | 12/2011 | Huynh | ................. H05B 47/185 315/291 |
| 2021/0076463 | A1 | 3/2021 | Corp | |

FOREIGN PATENT DOCUMENTS

| CN | 102056373 A | 5/2011 |
| CN | 203858848 U | 10/2014 |

(Continued)

*Primary Examiner* — Minh D A
(74) *Attorney, Agent, or Firm* — Global IP Services; Tianhua Gu

(57) ABSTRACT

A self-adaptive constant-current driving circuit for a three-channel multi-color LED, including a decoder, a two-phase non-overlapping circuit, and a LED constant-current driving circuit, where the decoder determines the number of lighted channels according to a first input signal, and generates a first switch control signal and a second switch control signal; the two-phase non-overlapping circuit modulates the first switch control signal into a first two-phase non-overlapping signal and a second two-phase non-overlapping signal, and modulates the second switch control signal into a third two-phase non-overlapping signal and a fourth two-phase non-overlapping signal; the LED constant-current driving circuit controls an on/off state of the respective channel of LED according to a second input signal, and outputs a current for controlling a brightness of the respective channel of LED according to the first two-phase non-overlapping signal, the second two-phase non-overlapping signal, the third two-phase non-overlapping signal, and the fourth two-phase non-overlapping signal.

15 Claims, 3 Drawing Sheets

(56) References Cited

FOREIGN PATENT DOCUMENTS

| CN | 204795803 U | 11/2015 |
|---|---|---|
| CN | 105979660 A | 9/2016 |
| CN | 106132025 A | 11/2016 |
| CN | 111083826 A | 4/2020 |
| CN | 113271702 A | 8/2021 |

\* cited by examiner

SELF-ADAPTIVE CONSTANT-CURRENT DRIVING CIRCUIT AND METHOD FOR THREE-CHANNEL MULTI-COLOR LED

CROSS REFERENCE TO RELATED PATENT APPLICATION

The present application is the US national stage of PCT/CN2021/138234 filed on 2021 Dec. 15, which claims the priority of the Chinese patent application No. 202110495126.0 filed on 2021 May 7, which application is incorporated herein by reference.

FIELD OF TECHNOLOGY

The present disclosure relates to the field of integrated circuit design, particularly to a self-adaptive constant-current driving circuit and a method for a three-channel multi-color LED.

BACKGROUND

A block diagram of a conventional light emitting diode (LED) constant-current driving circuit is shown in FIG. 1, where the constant currents of the three channels of the multi-color light emitting diode are independent of each other. Each constant current is generated by a reference current, and the constant current of each channel is fixed to ILED, which cannot be adjusted. When a single red, green, or blue light is on, the three-channel multi-color LED outputs one ILED current (i.e., a current with a magnitude of ILED), achieving the lowest brightness. When two of the red, green, and blue lights are on, the three-channel multi-color LED outputs two ILED currents, achieving a medium brightness. When the red, green, and blue lights are all on, the three-channel multi-color LED outputs three ILED currents, achieving the highest brightness. Therefore, the three-channel multi-color LED driven by independent constant currents has three channels independent of each other. This results in different sums of constant currents when the three-channel multi-color LED is in different color mixing conditions, highly fluctuated brightness, and discontinuous color mixing when colors are mixed directly. Although algorithms are used to adjust a PWM duty ratio of the three-channel multi-color LED to enable a continuous output of mixed colors, the number of mixed colors generated by lamp beads cannot reach 256×256×256=16777216.

SUMMARY

The present disclosure provides a self-adaptive constant-current driving circuit for a three-channel multi-color LED, including:
a decoder, a two-phase non-overlapping circuit, and a LED constant-current driving circuit,
where the decoder is used to determine the number of lighted channels according to a first input signal, and to generate a first switch control signal and a second switch control signal;
the two-phase non-overlapping circuit is used to modulate the first switch control signal into a first two-phase non-overlapping signal and a second two-phase non-overlapping signal, and to modulate the second switch control signal into a third two-phase non-overlapping signal and a fourth two-phase non-overlapping signal; and
the LED constant-current driving circuit is used to control a switch of a respective channel of the LED according to a second input signal, and to output a current to control a brightness of the respective channel of the LED according to the first two-phase non-overlapping signal, the two-phase non-overlapping signal, the third two-phase non-overlapping signal, and the fourth two-phase non-overlapping signal.

In an embodiment, the decoder includes
a decoding circuit, a first OR gate, and an output circuit,
where an input end of the decoding circuit receives the first input signal, an output end of the decoding circuit is connected to an input end of the first OR gate;
an output end of the first OR gate outputs the first switch control signal; and
an input end of the output circuit is connected to the input end of the first OR gate, and an output end of the output circuit outputs the second switch control signal.

In an embodiment, the decoding circuit includes a first decoding circuit, a second decoding circuit, and a third decoding circuit.

The first decoding circuit includes a first NOT gate, a second NOT gate, a third NOT gate, a fourth NOT gate, a fifth NOT gate, a sixth NOT gate, a seventh NOT gate, an eighth NOT gate, a first NAND gate, a second NAND gate, and a first NOR gate.

An input end of the first NOT gate receives the first input signal, and an output end of the first NOT gate is connected to an input end of the first NAND gate.

An input end of the second NOT gate receives the first input signal, and an output end of the second NOT gate is connected to the input end of the first NAND gate.

An input end of the third NOT gate receives the first input signal, and an output end of the third NOT gate is connected to the input end of the first NAND gate.

An input end of the fourth NOT gate receives the first input signal, and an output end of the fourth NOT gate is connected to the input end of the first NAND gate.

An input end of the fifth NOT gate receives the first input signal, and an output end of the fifth NOT gate is connected to an input end of the second NAND gate.

An input end of the sixth NOT gate receives the first input signal, and an output end of the sixth NOT gate is connected to the input end of the second NAND gate.

An input end of the seventh NOT gate receives the first input signal, and an output end of the seventh NOT gate is connected to the input end of the second NAND gate.

An input end of the eighth NOT gate receives the first input signal, and an output end of the eighth NOT gate is connected to the input end of the second NAND gate.

An output end of the first NAND gate is connected to a first input end of the first NOR gate, an output end of the second NAND gate is connected to a second input end of the first NOR gate, and
an output end of the first NOR gate is connected to a first input end of the first OR gate.

In an embodiment, the output circuit includes a first AND gate, a second AND gate, a third AND gate, and a second OR gate.

A first input end of the first AND gate is connected to the first input end of the first OR gate, a second input end of the first AND gate is connected to a second input end of the first OR gate, and an output end of the first AND gate is connected to a first input end of the second OR gate.

A first input end of the second AND gate is connected to the first input end of the first OR gate, a second input end of the second AND gate is connected to a third input end of the first OR gate, and an output end of the second AND gate is connected to a second input end of the second OR gate.

A first input end of the third AND gate is connected to the second input end of the first OR gate, a second input end of the third AND gate is connected to the third input end of the first OR gate, and an output end of the third AND gate is connected to a third input end of the second OR gate.

An output end of the second OR gate outputs the second switch control signal.

In a specific embodiment, the two-phase non-overlapping circuit includes a first modulation circuit and a second modulation circuit, where the first modulation circuit includes a ninth NOT gate, a second NOR gate, and a third NOR gate.

A first input end of the second NOR gate receives the first switch control signal, a second input end of the second NOR gate is connected to an output end of the third NOR gate, and an output end of the second NOR gate outputs the first two-phase non-overlapping signal.

An input end of the ninth NOT gate receives the first switch control signal, and an output end of the ninth NOT gate is connected to a second input end of the third NOR gate.

A first input end of the third NOR gate is connected to the output end of the second NOR gate, and an output end of the third NOR gate outputs the second two-phase non-overlapping signal.

In a specific embodiment, the LED constant-current driving circuit includes a buffer switch circuit, a driving circuit, and a first MOS transistor.

The buffer switch circuit is used to receive the second input signal and adjust an on or off speed of the respective channel of the LED.

The driving circuit controls a brightness of the respective channel of the LED according to the first two-phase non-overlapping signal, the two-phase non-overlapping signal, the third two-phase non-overlapping signal, and the fourth two-phase non-overlapping signal.

The first MOS transistor is used to output a current for controlling an on or off state of the respective channel of the LED.

In a specific embodiment, the driving circuit includes
a first current source, a second current source, a second MOS transistor, a third MOS transistor, a fourth MOS transistor, an operational amplifier, and a current mirror.

A first end of the first current source is connected to a power supply, and a second end of the first current source is connected to a drain of the second MOS transistor.

A first end of the second current source is connected to the power supply, and a second end of the second current source is connected to a drain of the third MOS transistor.

The third MOS transistor and the fourth MOS transistor constitute a common-source common-gate constant current source.

A gate of the third MOS transistor is connected to a gate of the second MOS transistor, and a source of the third MOS transistor is connected to a drain of the fourth MOS transistor and a non-inverting input end of the operational amplifier.

An output end of the operational amplifier is connected to a gate of the first MOS transistor, and is connected to a drain of the eighth MOS transistor and a drain of the ninth MOS transistor.

A first end of the current mirror is connected to a gate of the fourth MOS transistor, and a second end of the current mirror is connected to a source of the first MOS transistor.

In a specific embodiment, the current mirror includes
a first switch, a second switch, a third switch, a fourth switch, a fifth MOS transistor, a sixth MOS transistor, and a seventh MOS transistor.

The first two-phase non-overlapping signal controls an on/off state of the first switch, the second two-phase non-overlapping signal controls an on/off state of the second switch, the third two-phase non-overlapping signal controls an on/off state of the third switch, and the fourth two-phase non-overlapping signal controls an on/off state of the fourth switch.

A gate of the fifth MOS transistor is connected to the gate of the fourth MOS transistor through the first switch, the gate of the fifth MOS transistor is grounded through the second switch, a source of the fifth MOS transistor is grounded, and a drain of the fifth MOS transistor is connected to the source of the first MOS transistor.

A gate of the sixth MOS transistor is connected to the drain of the third MOS transistor, a source of the sixth MOS transistor is grounded, and a drain of the sixth MOS transistor is connected to the source of the first MOS transistor.

A gate of the seventh MOS transistor is connected to the gate of the fourth MOS transistor through the third switch, the gate of the seventh MOS transistor is grounded through the fourth switch, a source of the seventh MOS transistor is grounded, and a drain of the seventh MOS transistor is connected to the source of the first MOS transistor.

In a specific embodiment, the buffer switch circuit includes
a delay module, a tenth NOT gate, an eighth MOS transistor, and a ninth MOS transistor.

The delay module receives the second input signal and is connected to an input end of the tenth NOT gate.

A source of the eighth MOS transistor is connected to the power supply, a gate of the eighth MOS transistor is connected to an output end of the tenth NOT gate, and a drain of the eighth MOS transistor is connected to a drain of the ninth MOS transistor.

A source of the ninth MOS transistor is grounded, and a gate of the ninth MOS transistor receives the second input signal.

In a specific embodiment, a ratio of width-to-length of the fifth MOS transistor to width-to-length of the fourth MOS transistor is 1:1,
a ratio of width-to-length of the sixth MOS transistor to width-to-length of the fourth MOS transistor is 2:1, and
a ratio of width-length of the seventh MOS transistor to width-to-length of the fourth MOS transistor is 3:1.

The present disclosure further provides a constant-current driving method for driving a three-channel multi-color LED using the self-adaptive constant-current driving circuit, including:
determining the number of lighted channels of the three-channel multi-color LED according to an input signal;
when the number of lighted channels is 0, setting a constant current output by the LED constant-current driving circuit of the self-adaptive constant-current driving circuit as a preset value, and when the number of lighted channels is N, setting the constant current of each lighted channel of the LED as 1/N of the preset value to keep a sum of constant currents of the LED unchanged, where $3 \geq N \geq 1$.

The present disclosure has the following beneficial effects:
the self-adaptive constant-current driving circuit for a three-channel multi-color LED can keep the sum of the constant currents of the channels of the LED unchanged, and achieve uniform color mixing; in addition, the circuit of the present disclosure is simple, flexible, and reliable.

BRIEF DESCRIPTION OF THE DRAWINGS

To better illustrate the technical solutions of the embodiments of the present disclosure, the following will briefly introduce the drawings required for embodiment description. Obviously, the drawings in the following description are merely some embodiments of the present disclosure. For those of ordinary skill in the art, other drawings may be obtained based on these drawings without creative efforts.

DETAILED DESCRIPTION

The present disclosure will be described in detail by using the embodiments below.

Figure 1:
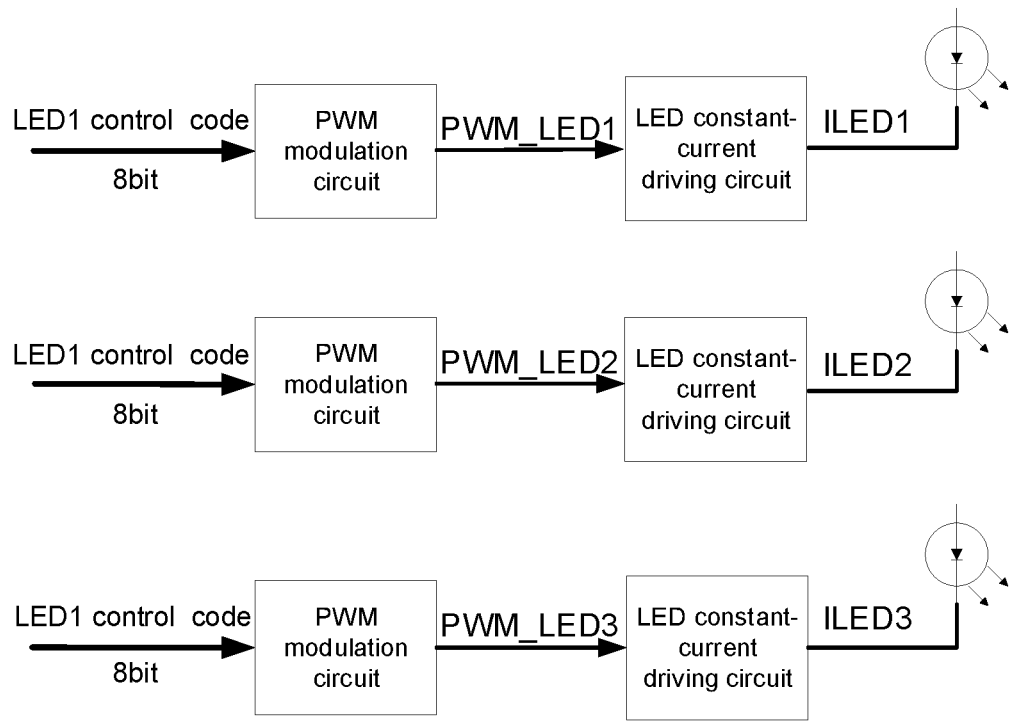
FIG. 1 shows a schematic diagram of a commonly used LED constant-current driving structure.
Figure 2:
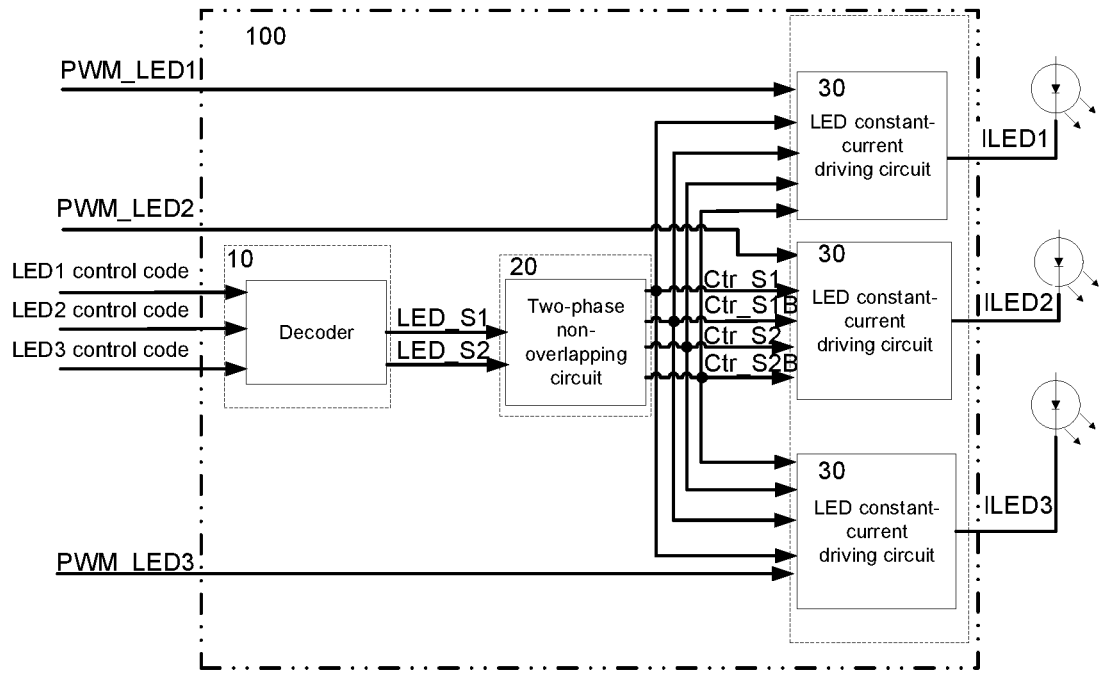
FIG. 2 shows a frame diagram of a self-adaptive constant-current driving circuit for a three-channel multi-color LED according to an embodiment of the present disclosure.

As shown in FIG. 2, an LED includes 3 sub lighting components LED1, LED2, and LED3, each corresponding to one channel. The LED is also referred to as a three-channel LED. The present disclosure provides a self-adaptive constant-current driving circuit for a three-channel multi-color LED, which includes:

a decoder 10, a two-phase non-overlapping circuit 20, and three LED constant-current driving circuits 30.

The decoder is used to determine the number of lighted channels according to first input signals, and to generate a first switch control signal LED_S1 and a second switch control signal LED_S2.

The two-phase non-overlapping circuit is used to modulate the first switch control signal LED_S1 into a first two-phase non-overlapping signal Ctr_S1 and a second two-phase non-overlapping signal Ctr_S1B, and to modulate the second switch control signal LED_S2 into a third two-phase non-overlapping signal Ctr_S2 and a fourth two-phase non-overlapping signal Ctr_S2B. The two-phase non-overlapping circuit controls a constant current of each channel of the LED to avoid an overlapping of switches.

The LED constant-current driving circuits are used to control an on/off state of the channels of the LED, respectively, according to second input signals, and to output currents to control a brightness of the channels of the LED, respectively, according to the first two-phase non-overlapping signal Ctr_S1, the second two-phase non-overlapping signal Ctr_S1B, the third two-phase non-overlapping signal Ctr_S2, and the fourth two-phase non-overlapping signal Ctr_S2B.

Figure 3:
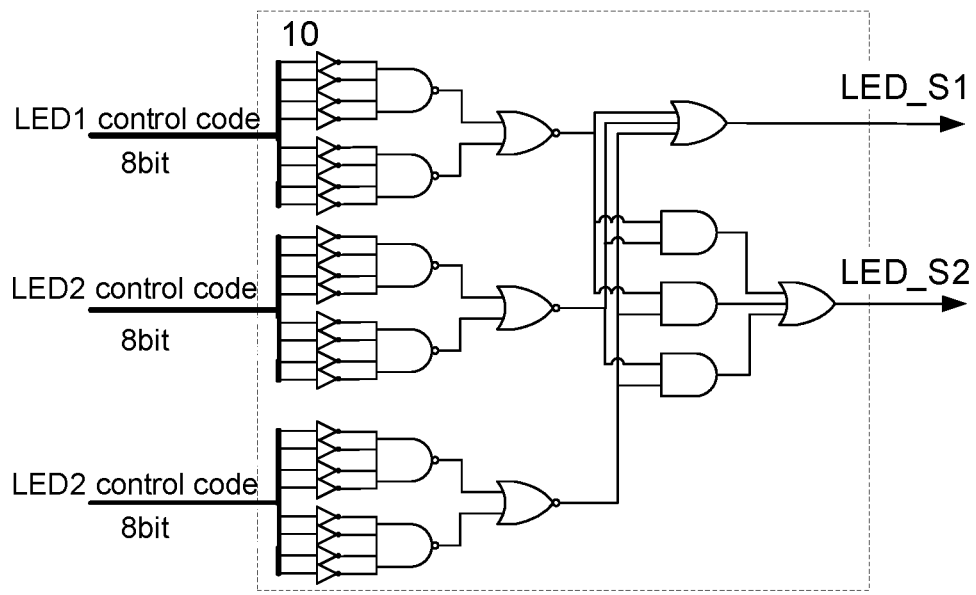
FIG. 3 shows a schematic diagram of a decoder according to an embodiment of the present disclosure.

As shown in FIG. 3, the first input signals are control codes of the three LED channels; specifically, the first input signals include an LED1 control code, an LED2 control code, and an LED3 control code. When one of the control codes (8 bits) is 0, the sub lighting component of the corresponding channel is in an off state, and when one of the control codes is not 0, the sub lighting component of the corresponding channel is in an on state. The decoder is used to determine the number N (3≥N≥1) of lighted channels (i.e., channels whose corresponding lighting component are in an on state) according to the first input signals, and to generate switch control signals.

The decoder includes
a decoding circuit, a first OR gate, and an output circuit, where
an input end of the decoding circuit receives the first input signals, an output end of the decoding circuit is connected to an input end of the first OR gate;
an output end of the first OR gate outputs the first switch control signal; and
an input end of the output circuit is connected to the input end of the first OR gate, and an output end of the output circuit outputs the second switch control signal.

In a specific embodiment, the decoder includes
a first decoding circuit, a second decoding circuit, and a third decoding circuit.

The first decoding circuit includes a first NOT gate, a second NOT gate, a third NOT gate, a fourth NOT gate, a fifth NOT gate, a sixth NOT gate, a seventh NOT gate, an eighth NOT gate, a first NAND gate, a second NAND gate, and a first NOR gate.

An input end of the first NOT gate receives the first input signals, and an output end of the first NOT gate is connected to an input end of the first NAND gate.

An input end of the second NOT gate receives the first input signals, and an output end of the second NOT gate is connected to the input end of the first NAND gate.

An input end of the third NOT gate receives the first input signals, and an output end of the third NOT gate is connected to the input end of the first NAND gate.

An input end of the fourth NOT gate receives the first input signals, and an output end of the fourth NOT gate is connected to the input end of the first NAND gate.

An input end of the fifth NOT gate receives the first input signals, and an output end of the fifth NOT gate is connected to an input end of the second NAND gate.

An input end of the sixth NOT gate receives the first input signals, and an output end of the sixth NOT gate is connected to the input end of the second NAND gate.

An input end of the seventh NOT gate receives the first input signals, and an output end of the seventh NOT gate is connected to the input end of the second NAND gate.

An input end of the eighth NOT gate receives the first input signals, and an output end of the eighth NOT gate is connected to the input end of the second NAND gate.

An output end of the first NAND gate is connected to a first input end of the first NOR gate, an output end of the second NAND gate is connected to a second input end of the first NOR gate, and
an output end of the first NOR gate is connected to a first input end of the first OR gate.

It should be noted that, in some embodiments, the structure and working process of the first decoding circuit provided are substantially the same as those of the second decoding circuit and the third decoding circuit, and related parts of the latter two can be referred to the foregoing description.

The output end of the first OR gate outputs the first switch control signal LED_S1.

The input end of the output circuit is connected to the input end of the first OR gate, and the output end of the output circuit outputs the second switch control signal LED_S2.

In a specific embodiment, the output circuit includes a first AND gate, a second AND gate, a third AND gate, and a second OR gate.

A first input end of the first AND gate is connected to the first input end of the first OR gate, a second input end of the first AND gate is connected to a second input end of the first OR gate, and an output end of the first AND gate is connected to a first input end of the second OR gate.

A first input end of the second AND gate is connected to the first input end of the it first OR gate, a second input end of the second AND gate is connected to a third input end of the first OR gate, and an output end of the second AND gate is connected to a second input end of the second OR gate.

A first input end of the third AND gate is connected to the second input end of the first OR gate, a second input end of the third AND gate is connected to a third input end of the first OR gate, and an output end of the third AND gate is connected to a third input end of the second OR gate.

An output end of the second OR gate outputs the second switch control signal LED_S2.

Figure 4:
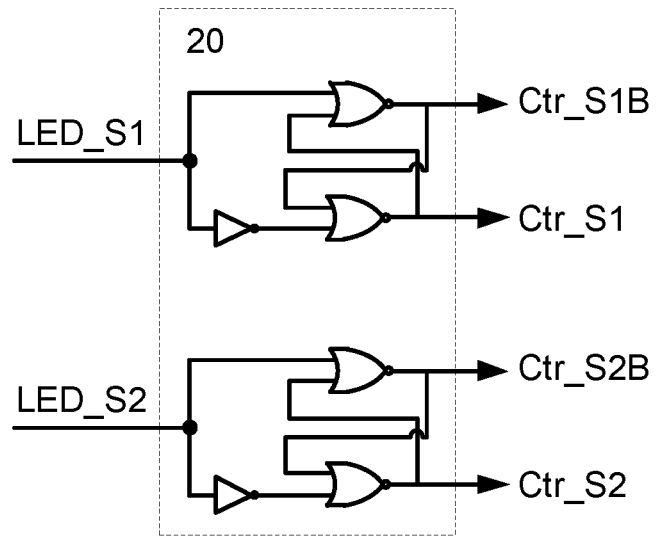
FIG. 4 shows a schematic diagram of a two-phase non-overlapping circuit according to an embodiment of the present disclosure.

As shown in FIG. 4, the two-phase non-overlapping circuit includes a first modulation circuit and a second modulation circuit,
where the first modulation circuit includes a ninth NOT gate, a second NOR gate, and a third NOR gate.

A first input end of the second NOR gate receives the first switch control signal LED_S1, a second input end of the second NOR gate is connected to an output end of the third NOR gate, and an output end of the second NOR gate outputs the first two-phase non-overlapping signal Ctr_S1.

An input end of the ninth NOT gate receives the first switch control signal LED_S1, and an output end of the ninth NOT gate is connected to a second input end of the third NOR gate.

A first input end of the third NOR gate is connected to the output end of the second NOR gate, and an output end of the third NOR gate outputs the second two-phase non-overlapping signal Ctr_S1B.

It should be noted that, in some embodiments, the structures and working processes of the first modulation circuit and the second modulation circuit are similar, related parts of the latter can be referred to the foregoing description.

Figure 5:
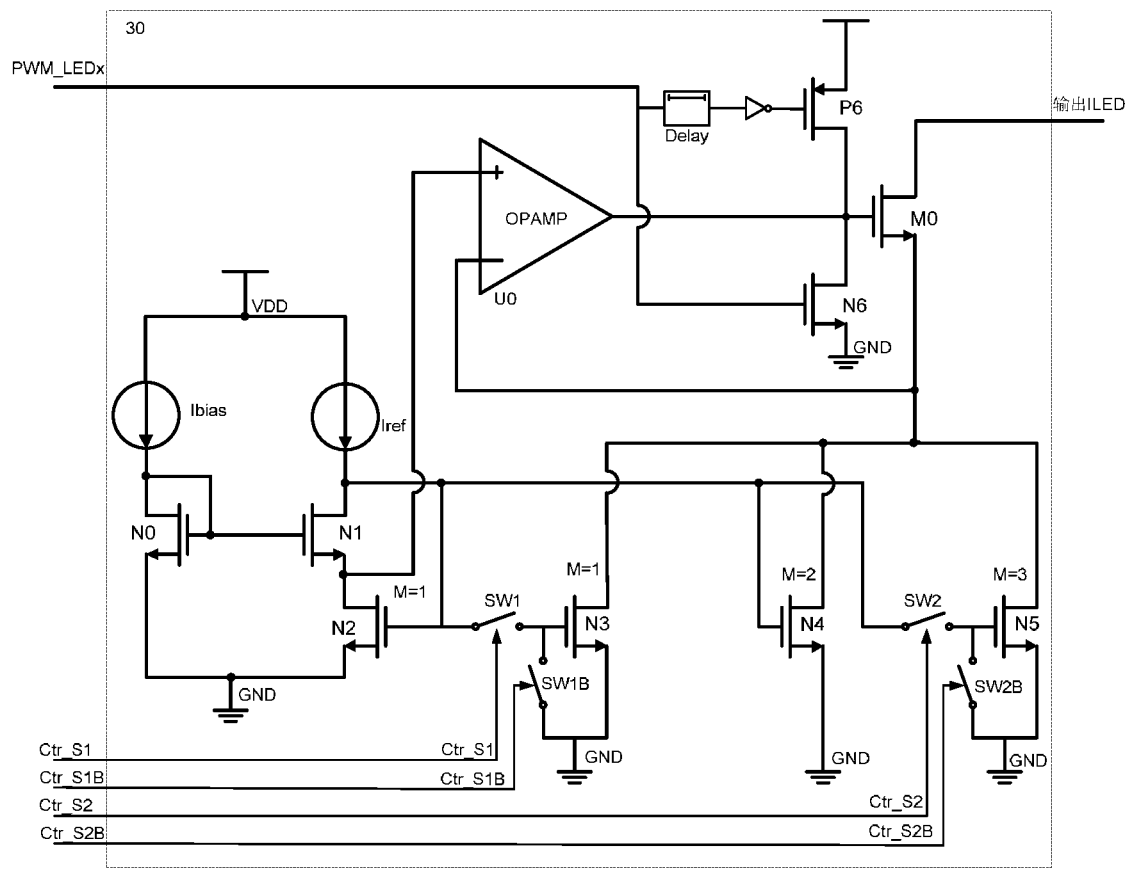
FIG. 5 shows a schematic diagram of a constant-current driving circuit according to an embodiment of the present disclosure.

As shown in FIG. 5, each LED constant-current driving circuit 30 includes a buffer switch circuit, a driving circuit, and a first MOS transistor M0.

The first MOS transistor M0 is used to output a current for controlling an on or off state of a corresponding channel of the LED.

The buffer switch circuit is used to receive one of the second input signal, which is a PWM signal (for example, PWM-LED1, PWM-LED2, and PWM-LED3 shown in FIG. 2) and adjust an on or off speed of the corresponding of the LED (i.e., how fast the channel is turned on or off).

The driving circuit controls a brightness of the corresponding channel of the LED according to the first two-phase non-overlapping signal Ctr_S1, the two-phase non-overlapping signal Ctr_S1B, the third two-phase non-overlapping signal Ctr_S2, and the fourth two-phase non-overlapping signal Ctr_S2B.

In a specific embodiment, the buffer switch circuit includes a delay module, a tenth NOT gate, an eighth MOS transistor P6, and a ninth MOS transistor N6.

The delay module receives one of the second input signals, which is PWM-LEDx shown in FIG. 5, and is connected to an input end of the tenth NOT gate.

A source of the eighth MOS transistor P6 is connected to a power supply, a gate of the eighth MOS transistor P6 is connected to an output end of the tenth NOT gate, and a drain of the eighth MOS transistor P6 is connected to a drain of the ninth MOS transistor N6.

A source of the ninth MOS transistor N6 is grounded, and a gate of the ninth MOS transistor N6 receives the second input signal (i.e., the PWM-LEDx).

In some embodiments, the delay module 11 is a delay circuit constructed by an even number of inverter chains.

The buffer switch circuit is beneficial to reducing a switching speed and a self-interference coupling of the switching process of the respective channel of the LED to the power supply.

In a specific embodiment, the driving circuit includes
a first current source Ibias, a second current source Iref, a second MOS transistor N0, a third MOS transistor N1, a fourth MOS transistor N2, an operational amplifier U0, and a current mirror.

A first end of the first current source Ibias is connected to the power supply, and a second end of the first current source Ibias is connected to a drain of the second MOS transistor N0.

A first end of the second current source Iref is connected to the power supply, and a second end of the second current source Iref is connected to a drain of the third MOS transistor N1.

The third MOS transistor N1 and the fourth MOS transistor N2 constitute a common-source common-gate constant current source.

A gate of the third MOS transistor N1 is connected to a gate of the second MOS transistor N0, and a source of the third MOS transistor N1 is connected to a drain of the fourth MOS transistor N2 and a non-inverting input end of the operational amplifier U0.

An output end of the operational amplifier U0 is connected to a gate of the first MOS transistor M0, and is connected to a drain of the eighth MOS transistor P6 and a drain of the ninth MOS transistor N6.

A first end of the current mirror is connected to a gate of the fourth MOS transistor N2, and a second end of the current mirror is connected to a source of the first MOS transistor M0.

The current mirror includes
a first switch SW1, a second switch SW1B, a third switch SW2, a fourth switch SW2B, a fifth MOS transistor N3, a sixth MOS transistor N4, and a seventh MOS transistor N5.

The first two-phase non-overlapping signal Ctr_S1 controls an on/off state of the first switch SW1, the second two-phase non-overlapping signal Ctr_S1B controls an on/off state of the second switch SW1B, the third two-phase non-overlapping signal Ctr_S2 controls an on/off state of the third switch SW2, and the fourth two-phase non-overlapping signal Ctr_S2B controls an on/off state of the fourth switch SW2B.

A gate of the fifth MOS transistor N3 is connected to a gate of the fourth MOS transistor N2 through the first switch SW1, the gate of the fifth MOS transistor N3 is grounded through the second switch SW1B, a source of the fifth MOS transistor N3 is grounded, and a drain of the fifth MOS transistor N3 is connected to the source of the first MOS transistor M0.

A gate of the sixth MOS transistor N4 is connected to the drain of the third MOS transistor N1, a source of the sixth MOS transistor N4 is grounded, and a drain of the sixth MOS transistor N4 is connected to the source of the first MOS transistor M0.

A gate of the seventh MOS transistor N5 is connected to the gate of the fourth MOS transistor N2 through the third switch SW2, the gate of the seventh MOS transistor N5 is grounded through the fourth switch SW2B, a source of the seventh MOS transistor N5 is grounded, and a drain of the seventh MOS transistor N5 is connected to the source of the first MOS transistor M0.

In a specific embodiment, a ratio of width-to-length of the fifth MOS transistor N3 to width-to-length of the fourth MOS transistor N2 is 1:1,
 a ratio of width-to-length of the sixth MOS transistor N4 to width-to-length of the fourth MOS transistor N2 is 2:1, and
 a ratio of width-length of the seventh MOS transistor N5 to width-to-length of the fourth MOS transistor N2 is 3:1.

The self-adaptive constant-current driving circuit for a three-channel multi-color LED provided by the present disclosure can keep the sum of the constant currents of the LED unchanged, and achieve uniform color mixing. In addition, the circuit of the present disclosure is simple, flexible, and reliable.

As shown in FIG. 2, each ILED corresponds to one LED constant-current driving circuit, and operation principles and working processes of the three LED constant-current driving circuits are similar. Related parts can be found in the above description, therefore, no repetition will be provided herein.

In a specific embodiment, the present disclosure further provides a constant-current driving method for the three-channel multi-color LED based on the self-adaptive constant-current driving circuit described above, including:
 determining the number of lighted channels of the three-channel multi-color LED according to input signals;
 when the number of lighted channels is 0, turning off constant current paths of the LED constant-current driving circuits according to PWM signals, and
 when the number of lighted channels is N, setting the constant current of each lighted channel of the LED as 1/N of a preset value to keep a sum of constant currents of the LED unchanged, where $3 \geq N \geq 1$.

More specifically, when the number of lighted channels N is 0, the first MOS transistor M0 is turned off according to the PWM signals. The LED has a total constant current, which is of a fixed value, ranging from 1 mA to 60 mA, which can be adjusted according to the user's needs.

When the number of lighted channels N is 1, Ctr_S1 and Ctr_S2 are at high levels, Ctr_S1B and Ctr_S2B are at low levels, N3 and N5, which function as constant current sources, are in the on states, and a current flowing into the source of the first MOS transistor M0, which serves as a single channel, is 6×Iref. Of the three channels of the LED, only one has its first MOS transistor M0 turned on, and those of the other two channels are turned off, and a sum of the currents of the three channels is 6×Iref.

When the number of lighted channels N is 2, Ctr_S1 and Ctr_S2B are at high levels, Ctr_S1B and Ctr_S2 are at low levels, N3, which functions as a constant current source, is in the on state, N5, which functions as a constant current source, is in the off state, and the current flowing into the source of the first MOS transistor M0, which serves as a single channel, is 3×Iref. Two of the first MOS transistors M0 of two channels are turned on among those of the three channels, the remaining one channel is in the off state, and a sum of the currents of the three channels is 3×Iref×2=6× Iref.

When the number of lighted channels N is 3, Ctr_S1 and Ctr_S2 are both at low levels, and Ctr_S1B and Ctr_S2B are both at high levels. N3 and N5, which function as constant current sources, are both in the off states, and the current flowing into the source of the first MOS transistor M0, which serves as a single channel, is 2×Iref. All of the first MOS transistors M0 of the three channels are turned on, and a sum of the currents of the three channels is 2×Iref×3=6× Iref.

In a specific embodiment, the first switch, the second switch, the third switch, or the fourth switch may be a CMOS switch, which is in the on state when it receives a high-level signal, and is in the off state when it receives a low-level signal.

In the constant-current driving method for the three-channel multi-color LED based on the self-adaptive constant-current driving circuit, regardless of the number of lighted channels N, the sum of the constant currents of the lighted channels is the same once the LED is turned on. In addition, the method is simple, flexible, and reliable, and uniform LED color mixing can be achieved.

Obviously, the above embodiments of the present disclosure are only examples for clearly illustrating the present disclosure, and are not intended to limit the implementations of the present disclosure. For those of ordinary skill in the art, changes or variations in other different forms can also be made on the basis of the above description. All possible embodiments cannot be provided here, therefore, any obvious changes or variations drawn from the technical solutions of the present disclosure are still within the protection scope of the present disclosure.

What is claimed is:

1. A self-adaptive constant-current driving circuit for a three-channel multi-color LED, comprising a decoder, a two-phase non-overlapping circuit, and a LED constant-current driving circuit, wherein
 the decoder is used to determine the number of lighted channels according to a first input signal, and to generate a first switch control signal and a second switch control signal;
 the two-phase non-overlapping circuit is used to modulate the first switch control signal into a first two-phase non-overlapping signal and a second two-phase non-overlapping signal, and to modulate the second switch control signal into a third two-phase non-overlapping signal and a fourth two-phase non-overlapping signal; and
 the LED constant-current driving circuit is used to control an on/off state of a respective channel of the LED according to a second input signal, and to output a current to control a brightness of the respective channel of the LED according to the first two-phase non-overlapping signal, the second two-phase non-overlapping signal, the third two-phase non-overlapping signal, and the fourth two-phase non-overlapping signal.

2. The self-adaptive constant-current driving circuit for a three-channel multi-color LED according to claim 1, wherein the first input signal is a control code of the respective channel of the LED;
 when the control code is 0, the respective channel is in an off state, and
 when the control code is not 0, the respective channel is in an on state.

3. The self-adaptive constant-current driving circuit for a three-channel multi-color LED according to claim 1, wherein the decoder comprises a decoding circuit, a first OR gate, and an output circuit, wherein an input end of the decoding circuit receives the first input signal, an output end of the decoding circuit is connected to an input end of the first OR gate;

an output end of the first OR gate outputs the first switch control signal; and an input end of the output circuit is connected to the input end of the first OR gate, and an output end of the output circuit outputs the second switch control signal.

4. The self-adaptive constant-current driving circuit for a three-channel multi-color LED according to claim 3, wherein the decoding circuit comprises a first decoding circuit, a second decoding circuit, and a third decoding circuit, wherein the first decoding circuit comprises a first NOT gate, a second NOT gate, a third NOT gate, a fourth NOT gate, a fifth NOT gate, a sixth NOT gate, a seventh NOT gate, an eighth NOT gate, a first NAND gate, a second NAND gate, and a first NOR gate, wherein an input end of the first NOT gate receives the first input signal, and an output end of the first NOT gate is connected to an input end of the first NAND gate;

an input end of the second NOT gate receives the first input signal, and an output end of the second NOT gate is connected to the input end of the first NAND gate;

an input end of the third NOT gate receives the first input signal, and an output end of the third NOT gate is connected to the input end of the first NAND gate;

an input end of the fourth NOT gate receives the first input signal, and an output end of the fourth NOT gate is connected to the input end of the first NAND gate;

an input end of the fifth NOT gate receives the first input signal, and an output end of the fifth NOT gate is connected to an input end of the second NAND gate;

an input end of the sixth NOT gate receives the first input signal, and an output end of the sixth NOT gate is connected to the input end of the second NAND gate;

an input end of the seventh NOT gate receives the first input signal, and an output end of the seventh NOT gate is connected to the input end of the second NAND gate;

an input end of the eighth NOT gate receives the first input signal, and an output end of the eighth NOT gate is connected to the input end of the second NAND gate;

an output end of the first NAND gate is connected to a first input end of the first NOR gate, an output end of the second NAND gate is connected to a second input end of the first NOR gate; and an output end of the first NOR gate is connected to a first input end of the first OR gate.

5. The self-adaptive constant-current driving circuit for a three-channel multi-color LED according to claim 4, wherein a structure of the first decoding circuit is the same as those of the second decoding circuit and the third decoding circuit.

6. The self-adaptive constant-current driving circuit for a three-channel multi-color LED according to claim 3, wherein the output circuit comprises a first AND gate, a second AND gate, a third AND gate, and a second OR gate, wherein a first input end of the first AND gate is connected to the first input end of the first OR gate, a second input end of the first AND gate is connected to a second input end of the first OR gate, and an output end of the first AND gate is connected to a first input end of the second OR gate;

a first input end of the second AND gate is connected to the first input end of the first OR gate, a second input end of the second AND gate is connected to a third input end of the first OR gate, and an output end of the second AND gate is connected to a second input end of the second OR gate;

a first input end of the third AND gate is connected to the second input end of the first OR gate, a second input end of the third AND gate is connected to the third input end of the first OR gate, and an output end of the third AND gate is connected to a third input end of the second OR gate; and an output end of the second OR gate outputs the second switch control signal.

7. The self-adaptive constant-current driving circuit for a three-channel multi-color LED according to claim 1, wherein the two-phase non-overlapping circuit comprises a first modulation circuit and a second modulation circuit, wherein the first modulation circuit comprises a ninth NOT gate, a second NOR gate, and a third NOR gate; wherein a first input end of the second NOR gate receives the first switch control signal, a second input end of the second NOR gate is connected to an output end of the third NOR gate, and an output end of the second NOR gate outputs the first two-phase non-overlapping signal;

an input end of the ninth NOT gate receives the first switch control signal, and an output end of the ninth NOT gate is connected to a second input end of the third NOR gate; and a first input end of the third NOR gate is connected to the output end of the second NOR gate, and an output end of the third NOR gate outputs the second two-phase non-overlapping signal.

8. The self-adaptive constant-current driving circuit for a three-channel multi-color LED according to claim 7, wherein a structure of the first modulation circuit is the same as that of the second modulation circuit.

9. The self-adaptive constant-current driving circuit for a three-channel multi-color LED according to claim 1, wherein the LED constant-current driving circuit comprises a buffer switch circuit, a driving circuit, and a first MOS transistor;

wherein the buffer switch circuit is used to receive the second input signal and adjust an on or off speed of the respective channel of the LED;

the driving circuit controls a brightness of the respective channel of the LED according to the first two-phase non-overlapping signal, the two-phase non-overlapping signal, the third two-phase non-overlapping signal, and the fourth two-phase non-overlapping signal; and the first MOS transistor is used to output a current for controlling an on or off state of the respective channel of the LED.

10. The self-adaptive constant-current driving circuit for a three-channel multi-color LED according to claim 9, wherein the driving circuit comprises a first current source, a second current source, a second MOS transistor, a third MOS transistor, a fourth MOS transistor, an operational amplifier, and a current mirror;

wherein a first end of the first current source is connected to a power supply, and a second end of the first current source is connected to a drain of the second MOS transistor; a first end of the second current source is connected to the power supply, and a second end of the second current source is connected to a drain of the third MOS transistor;

the third MOS transistor and the fourth MOS transistor constitute a common-source common-gate constant current source;

a gate of the third MOS transistor is connected to a gate of the second MOS transistor, and a source of the third MOS transistor is connected to a drain of the fourth MOS transistor and a non-inverting input end of the operational amplifier;

an output end of the operational amplifier is connected to a gate of the first MOS transistor, and is connected to a drain of the eighth MOS transistor and a drain of the ninth MOS transistor; and a first end of the current mirror is connected to a gate of the fourth MOS transistor, and a second end of the current mirror is connected to a source of the first MOS transistor.

11. The self-adaptive constant-current driving circuit for a three-channel multi-color LED according to claim 10, wherein the current mirror comprises a first switch, a second switch, a third switch, a fourth switch, a fifth MOS transistor, a sixth MOS transistor, and a seventh MOS transistor;

wherein the first two-phase non-overlapping signal controls an on/off state of the first switch, the second two-phase non-overlapping signal controls an on/off state of the second switch, the third two-phase non-overlapping signal controls an on/off state of the third switch, and the fourth two-phase non-overlapping signal controls an on/off state of the fourth switch;

a gate of the fifth MOS transistor is connected to the gate of the fourth MOS transistor through the first switch, the gate of the fifth MOS transistor is grounded through the second switch, a source of the fifth MOS transistor is grounded, and a drain of the fifth MOS transistor is connected to the source of the first MOS transistor;

a gate of the sixth MOS transistor is connected to the drain of the third MOS transistor, a source of the sixth MOS transistor is grounded, and a drain of the sixth MOS transistor is connected to the source of the first MOS transistor; and a gate of the seventh MOS transistor is connected to the gate of the fourth MOS transistor through the second switch, the gate of the seventh MOS transistor is grounded through the fourth switch, a source of the seventh MOS transistor is grounded, and a drain of the seventh MOS transistor is connected to the source of the first MOS transistor.

12. The self-adaptive constant-current driving circuit for a three-channel multi-color LED according to claim 11, wherein a ratio of width-to-length of the fifth MOS transistor to width-to-length of the fourth MOS transistor is 1:1, a ratio of width-to-length of the sixth MOS transistor to width-to-length of the fourth MOS transistor is 2:1, and a ratio of width-to-length of the seventh MOS transistor to width-to-length of the fourth MOS transistor is 3:1.

13. The self-adaptive constant-current driving circuit for a three-channel multi-color LED according to claim 10, wherein the buffer switch circuit comprises a delay module, a tenth NOT gate, an eighth MOS transistor, and a ninth MOS transistor; wherein the delay module receives the second input signal and is connected to an input end of the tenth NOT gate;

a source of the eighth MOS transistor is connected to the power supply, a gate of the eighth MOS transistor is connected to an output end of the tenth NOT gate, and a drain of the eighth MOS transistor is connected to a drain of the ninth MOS transistor; and a source of the ninth MOS transistor is grounded, and a gate of the ninth MOS transistor receives the second input signal.

14. The self-adaptive constant-current driving circuit for a three-channel multi-color LED according to claim 13, wherein the delay module is a delay circuit constructed by an even number of inverter chains.

15. A constant-current driving method for driving a three-channel multi-color LED using the self-adaptive constant-current driving circuit according to claim 1, comprising:

determining the number of lighted channels of the three-channel multi-color LED according to the first input signal;

when the number of lighted channels is 0, setting a constant current output by the LED constant-current driving circuit of the self-adaptive constant-current driving circuit as a preset value, and when the number of lighted channels is N, setting the constant current of each lighted channel of the LED as 1/N of the preset value to keep a sum of constant currents of the LED unchanged, wherein 3≥N≥1.

* * * * *